United States Patent [19]

Kaji et al.

[11] Patent Number: 5,020,021

[45] Date of Patent: May 28, 1991

[54] SYSTEM FOR AUTOMATIC LANGUAGE TRANSLATION USING SEVERAL DICTIONARY STORAGE AREAS AND A NOUN TABLE

[75] Inventors: Hiroyuki Kaji, Tama; Yoshihiko Nitta, Sagamihara, both of Japan

[73] Assignee: Hitachi, Ltd., Tokyo, Japan

[21] Appl. No.: 817,624

[22] Filed: Jan. 10, 1986

[30] Foreign Application Priority Data

Jan. 14, 1985 [JP] Japan ................................. 60-4625

[51] Int. Cl.$^5$ ........................................... G06F 15/38
[52] U.S. Cl. ................................ 364/900; 364/920.4;
364/963; 364/963.3; 364/963.4; 364/975;
364/943
[58] Field of Search ... 364/900 MS File, 200 MS File,
364/419, 300

[56] References Cited

U.S. PATENT DOCUMENTS

| | | | |
|---|---|---|---|
| 4,502,128 | 2/1985 | Okajima et al. | 364/900 |
| 4,586,160 | 4/1986 | Amano et al. | 364/900 |
| 4,597,055 | 6/1986 | Hashimoto et al. | 364/900 |
| 4,599,691 | 7/1986 | Sakaki et al. | 364/419 |
| 4,633,435 | 12/1986 | Morimoto et al. | 364/900 |
| 4,641,264 | 2/1987 | Nitta et al. | 364/900 |
| 4,654,798 | 3/1987 | Taki et al. | 364/419 |
| 4,706,212 | 11/1987 | Toma | 364/900 |

OTHER PUBLICATIONS

Webster's Ninth New Collegiate Dictionary, 1986, p. 211.
M. Nagao et al., "A Machine Translation System from Japanese to English", Proceedings of the 8th International Conference on Computational Linguistics (Sep. 30–Oct. 4, 1980), pp. 414-423.

Primary Examiner—Archie E. Williams, Jr.
Assistant Examiner—Robert B. Harrell
Attorney, Agent, or Firm—Antonelli, Terry, Stout & Kraus

[57] ABSTRACT

A translation method for a machine translation system provided with apparatus for parsing a source language sentence and for forming a target language translation in which a phrase omitted in the source language sentence is identified, and a word or phrase to be inserted for the omitted phrase is selected from stored words and phrases. For identifying an omitted phrase, a sentence pattern corresponding to a predicate in the source language sentence is formed so as to include not only cases governed by the predicate but also a semantic feature for each case. By comparing the source language sentence with the sentence pattern, a case which is omitted in the source language sentence but cannot be omitted in the target language translation is identified. For determining a word or phrase to be placed at the position of the omitted phrase, the nouns having appeared in the source language text is stored in a noun, together with the semantic feature, gender, person and number of each noun is searched for a noun having the same semantic feature as the omitted phrase. When a target language translation of the source language sentence is formed, a pronoun having the same gender, person and number as the omitted phrase is used as a target language equivalent for the omitted phrase, and thus a target language translation which is grammatically correct, is obtained.

6 Claims, 4 Drawing Sheets

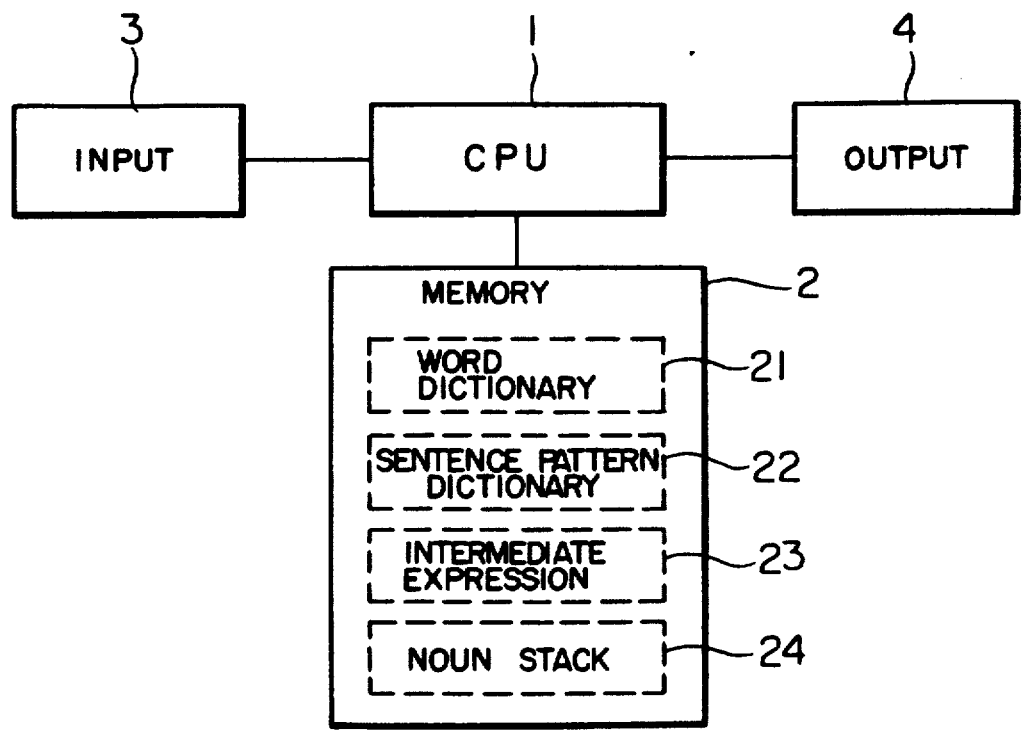

FIG. 4

| 221 | 222 | | | |
|---|---|---|---|---|
| T5 | AG | * | OB | (SO) — 2221 |
| | NP | V | NP | PP (from) — 2222 |
| | SUB | — | OB | OB — 2223 |
| | +HUM | — | +CON | +HUM — 2224 |
| | (GA/WA) | — | (WO) | (KARA) — 2225 |
| T12 | AG | * | (RE) | OB — 2221 |
| | NP | V | NP | NP — 2222 |
| | SUB | — | OB | OB — 2223 |
| | +HUM | — | +HUM | +CON — 2224 |
| | (GA/WA) | — | (NI) | (WO) — 2225 |

FIG. 5a

| AG | * | OB | — 231 |
|---|---|---|---|
| SUB | — | OB | — 232 |
| +HUM | — | +CON | — 233 |
| HANAKO | RECEIVE | — | — 234 |
| F | — | — | — 235 |
| 3 | — | — | — 236 |
| S | — | — | — 237 |

FIG. 5b

| AG | * | OB | — 231 |
|---|---|---|---|
| SUB | — | OB | — 232 |
| +HUM | — | +CON | — 233 |
| HANAKO | RECEIVE | — | — 234 |
| F | — | N | — 235 |
| 3 | — | 3 | — 236 |
| S | — | S | — 237 |

FIG. 6

| 241 | 242 | 243 | 244 | 245 |
|---|---|---|---|---|
| (TARO) | +HUM | M | 3 | S |
| (TEGAMI) | +CON | N | 3 | S |

FIG. 7

| | | S | | | P | | |
|---|---|---|---|---|---|---|---|
| | | SUB | POS | OB | SUB | POS | OB |
| FIRST PERSON | | I | my | me | we | our | us |
| SECOND PERSON | | you | your | you | you | your | you |
| THIRD PERSON | M | he | his | him | they | their | them |
| | F | she | her | her | | | |
| | N | it | its | it | | | |

SYSTEM FOR AUTOMATIC LANGUAGE TRANSLATION USING SEVERAL DICTIONARY STORAGE AREAS AND A NOUN TABLE

BACKGROUND OF THE INVENTION

1. Field of the Invention

The present invention relates to automatic translation, and more particularly to a translation method suitable for use in an automatic translation system at a time an input text which is written in a natural language and in which some phrases are omitted, is translated into another natural language, and a system for carrying out this method.

2. Description of the Prior Art

In an automatic translation system for a text written in a natural language, a method has hitherto been used in which a source language text (namely, a text written in a source language) is parsed or analyzed, to be converted into an intermediate expression such as a syntactic tree or a conceptional structure, and then a target language translation of the text is formed, as described in a Japanese patent application (unexamined publication No. 58-4482). The target language translation is formed in such a manner that each word or concept included in the source language text is converted into a target language equivalent by utilizing a dictionary, and target language equivalents thus obtained are arranged in accordance with the grammar of the target language. The above method does not consider when a word or phrase is omitted in the source language text. Even when a phrase can be omitted in the source language text, a target language equivalent for the omitted phrase is not always omissible in the target language translation of the source language text. Accordingly, when a phrase is omitted in the source language text, there arises a problem that a grammatically erroneous translation may be formed or a target language translation of the source language text cannot be formed. Specifically, when a Japanese text is translated into English, a subject or object of a sentence is often omitted in the Japanese text, but an English equivalent for the above subject or object cannot be omitted in an English translation which should be grammatically correct. Accordingly, it is very important from the practical point of view to study how to treat a phrase which is omitted in a Japanese text.

SUMMARY OF THE INVENTION

An object of the present invention is to provide a translation method and a system capable of eliminating the above problem in the prior art, and forming a translation which is written in a target language and is grammatically correct, from a text which is written in a source language and in which a phrase is omitted, by using an appropriate pronoun or the like in the translation, thereby improving the quality of the translation.

In order to attain the above object, according to an embodiment of the present invention, there is provided a translation method used in a machine translation system provided with apparatus for parsing a source language sentence and for forming a target language translation thereof, which method includes the steps of storing, in a memory device, a sentence pattern corresponding to a source language sentence having a phrase being omitted in the source language sentence, storing a target language equivalent for the omitted phrase in the memory device so that the target language equivalent corresponds to the sentence pattern, and comparing the source language sentence with the sentence pattern, to form a target language translation of the source language sentence in such a manner that the target language equivalent for the omitted phrase is used in a target language sentence corresponding to the sentence pattern, when the source language sentence agrees with the sentence pattern.

BRIEF DESCRIPTION OF THE DRAWINGS

FIG. 2 is a block diagram showing the construction of a Japanese-English translation system, to which the embodiment of FIG. 1 is applied.

FIG. 3 is a diagram showing the data structure of a word dictionary.

FIG. 4 is a diagram showing the data structure of a sentence pattern dictionary.

FIGS. 5a and 5b are diagrams each showing the data structure of an intermediate expression.

FIG. 6 is a diagram showing the data structure of a noun stack.

FIG. 7 is a table showing the declension of personal pronouns.

DESCRIPTION OF THE PREFERRED EMBODIMENT

Figure 1:
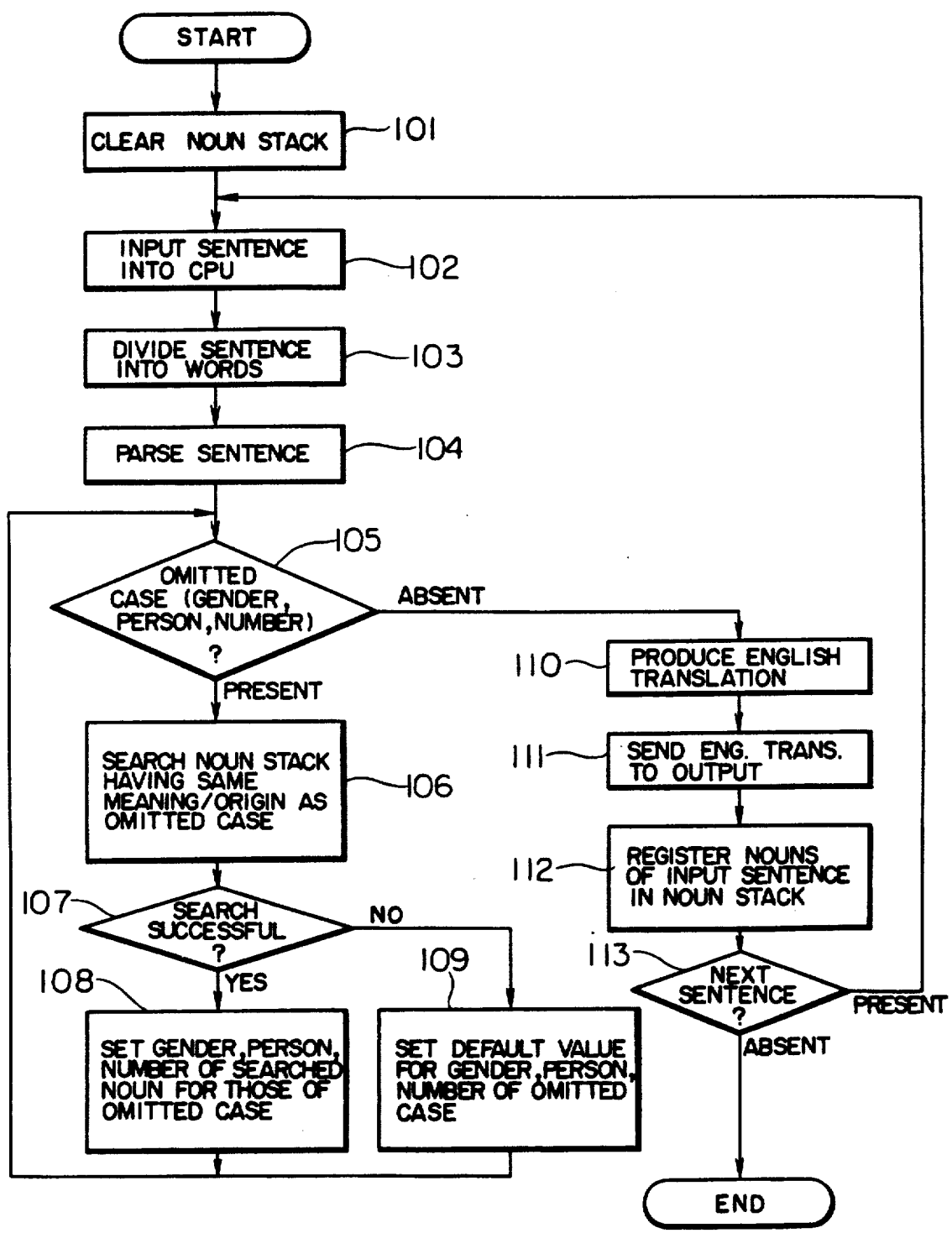
FIG. 1 is a flow chart showing an embodiment of a translation method according to the present invention.

An embodiment of machine translation according to the present invention will be explained below, by reference to the drawings. Following description will be made mainly in reference to a translation system for translating a Japanese text into English, by way of example.

FIG. 2 shows, in block form, the construction of a Japanese-English translation system, to which the present embodiment is applied. In FIG. 2, reference numeral 1 designates a central processing unit for analyzing a source language text (namely, an input text), for forming a target language translation of the input text, and for controlling various parts of the translation system, 2 a memory device for storing information necessary for the Japanese-English translation, 3 an input device for inputting the source language text, and 4 an output device for outputting the target language translation. The memory device 2 has an area for a word dictionary 21, an area for a sentence pattern dictionary 22, an area for an intermediate expression 23, and an area for a noun 24. It is needless to say that, in the Japanese-English translation system of FIG. 2, the source language text is a Japanese text, and the target language translation is the English translation of the Japanese text.

FIG. 3 shows the data structure of the word dictionary 21 stored in the memory device 2.

Referring to FIG. 3, the word dictionary 21 contains a large number of records each including a Japanese entry word 211, the part 212 of speech of the entry word 211, an English equivalent 213 for the entry word 211, the part 214 of speech of the English equivalent 213, the semontic feature 215 of the entry word, the gender 216 of the entry word, the person 217 of the entry word, and the registration number 218 of a sentence pattern. The word dictionary 21 can be retrieved by using the Japanese entry word 211 as a key word.

FIG. 4 shows the data structure of the sentence pattern dictionary 22 stored in the memory device 2.

Referring to FIG. 4, the sentence pattern dictionary 22 stores a case frame 222 for each sentence pattern number 221, and can be retrieved by using the sentence pattern number 211 as a key word. A case is a word or phrase indicating a semantic role, in other words, an inflectional from of a noun, pronoun or adjective indicated by its grammatical relation to other words. In the case frame 222, cases 2221 governed by a predicate are arranged in accordance with the word order in an English sentence of surface or apparent structure. In FIG. 4, reference symbol AG designates an agent case, OB an object case, SO a source case, RE a receiver case, and * a predicate acting as the nucleus of sentence pattern. Further, an omissible case in an English sentence of surface structure is put in parentheses. For each of the agent case AG, the object case OB, the source case SO and the receiver case RE, there are shown a phrase mark (such as a noun phrase NP or a preposition phrase PP having a preposition) 2222 in an English sentence of surface structure, a formal case (such as a subjective case, an objective case, or a possessive case) 2223, the semantic feature 2224 of a noun used in the case, and a case mark (namely, an auxiliary word for indicating a case) 2225 in a Japanese sentence of surface structure. It is to be noted that the term "case" is herein used for expressing a semantic case or semantic role in a sentence of deep structure. Hence the subjective, objective and possessive cases (semantic roles) in the English grammar are called the formal case.

FIGS. 5a and 5b show the data structure of the intermediate expression 23 stored in the memory device 2. The intermediate expression 23 shows the case structure of a sentence. That is, cases 231 necessary for forming a sentence pattern corresponding to a predicate in an input sentence are arranged so as to form the sentence pattern, and the above cases include not only a case included in the input sentence but also a case which is omitted in the input sentence but cannot be omitted in an English sentence of surface structure. For each case 231, the intermediate expression 23 has a field for describing a formal case 232, a field for describing the semantic feature 233, a field for describing an English equivalent 234, a field for describing the gender (namely, the masculine, feminine or neuter gender) 235, a field for describing the person (namely, the first, second or third person) 236, and a field for describing the number (namely, the singular or plural number) 237.

FIG. 6 shows the data structure of the noun stack 24 formed in the memory device 2.

The noun 24 nouns included in an input text, in the order of appearance. For each noun 241, the 24 stores the 242, the gender 243, the person 244 and the number (the singular or plural number) 245 of the noun. When the noun 24 is searched for a desired noun, the nouns in the 24 are accessed in such a manner that a noun which was last registered in the, is first read out.

FIG. 1 is a flow chart showing an embodiment of a translation method according to the present invention. The processing in each step of the flow chart is carried out by the central processing unit 1 of FIG. 2.

Now, the present embodiment will be explained below, by reference to the flow chart of FIG. 1.

Prior to the translation of a Japanese text into English, the noun 24 is cleared (step 101). Then, one sentence in a Japanese text is loaded into the central processing unit (step 102), and the input sentence is divided into words while retrieving the word dictionary 21 (step 103). The division of the input sentence into words is carried out, for example, by a method which has been proposed by the present inventors and disclosed in a Japanese patent application (Application No. 59-162443). Then, the input sentence is parsed (or analyzed) to obtain an intermediate expression 23 (step 104). The parsing is carried out in such a manner that the sentence pattern dictionary 22 is searched for a sentence pattern corresponding to a predicate in the input sentence, and the sentence pattern is compared with the input sentence. Further, in the parsing, it is checked whether or not a noun phrase in the input sentence has the same semantic feature and case mark as a case in the sentence pattern, to determine the case of the noun phrase.

In the intermediate expression 23 thus obtained, however, the English equivalent 234, the gender 235, the person 236 and the number 237 of a case which is omitted in the input sentence but cannot be omitted in an English translation thereof, are undecided. It is checked in step 105 whether or not a case is omitted in the input sentence. When a case is omitted in the input sentence, the noun 24 is searched for a noun having the semantic feature required for the omitted case (step 106). In step 107, it is checked whether the search results in success or failure (that is, it is checked whether or not a noun satisfying the above requirement is present in the noun 24). When a noun having the semantic feature equal to the semantic feature 233 indicated in the intermediate expression 23 is present in the noun 24, it is considered that such noun is to be put for the omitted case, and, the gender 243, the person 244 and the number 245 of this noun are set in the intermediate expression 23 (step 108). When the noun having the same semantic feature as required in the intermediate expression 23 is absent in the noun 24, default values are set to the gender, the person and the number of the omitted case, that is, a character N (indicating the neuter gender), a numeral 3 (indicating the third person) and a character S (indicating the singular number) are set (step 109). When it is judged in step 105 that an omitted case whose gender, person and number are undecided, is absent, an English translation of the input sentence is formed (step 110). When the English translation is formed, a pronoun equivalent for that case in the intermediate expression 23 whose English equivalent 234 is not yet decided, is determined from the personal pronoun declension table of FIG. 7, on the basis of the formal case 232, the gender 235, the person 236 and the number 237 of the above case. Thereafter, English equivalents are arranged in accordance with the order of cases in the intermediate expression 23, to obtain the English translation. Then, the English translation is sent to the output device 4 (step 111). Further, each of nouns having appeared on the input sentence is registered in the noun 24, to prepare for the translation of the next input sentence into English (step 112). The semantic feature, gender and person of this noun in the word dictionary 21 are written in the noun table 24 as the semantic feature 242, the gender 243 and the person 244, respectively. Further, the number of this noun determined by the parsing of the input sentence is written in the noun 24 as the number 245. When the registration of nouns in the noun 24 is completed, the next Japanese sentence is translated into English (step 113).

Next, explanation will be made of an example where a Japanese text "Taro wa tegami wo kaita, Hanako wa ukettota" is translated into English, by way of example.

Now, let us consider a state that the first sentence of the Japanese text has been translated into English. Then, the noun 24 will have the contents shown in FIG. 6. Next, the second sentence is loaded into and parsed by the central processing unit 1, and thus the intermediate expression 23 of FIG. 5a is obtained. In the second sentence "Hanako wa ukettota", the object case OB is omitted, and hence the English equivalent 234, the gender 235, the person 236 and the number 237 of the object case are undecided. Thus, the noun, 24 is searched for a noun having the semantic feature equal to the meaning/origin (+CON) required for the object case. As is apparent from FIG. 6, a Japanese word "tegami" is found in the noun. The gender 243, the person 244 and the number 245 of the Japanese word "tegami" in the noun 24 are set in the intermediate expression 23 as the gender 235, the person 236 and the number 237 of the object case, respectively, and thus the intermediate expression 23 of FIG. 5b is obtained. When an English translation of the second sentence is formed from the intermediate expression 23 of FIG. 5b, a pronoun "it" having the same gender, person and number as the omitted object case, that is, having the neuter gender, the third person and the singular number, is used as an English equivalent for the omitted object case. Thus, an English translation "Taro wrote a letter. Hanako received it." is obtained.

As has been explained in the foregoing, according to the present embodiment, even when a phrase is omitted in an original text of a source language and a target language equivalent for the omitted phrase cannot be omitted in the target language translation of the original text, a grammatically correct translation can be formed by utilizing an appropriate pronoun or others. That is, the present embodiment carries out the processing indispensable for an automatic translation system using the Japanese language which contains a large number of omissible words, as the source language, and thus produces marked effects from the practical point of view, in that the formation of a grammatically erroneous translation is avoided, and in that even when one or more phrases are omitted in an original text, a translation thereof can be formed. Further, an appropriate one of a plurality of English equivalents for a Japanese verb can be determined by utilizing the semantic feature of a noun which is supplemented by the present embodiment. Although a case where a Japanese text is translated into English, has been explained in the present embodiment, the present invention is also applicable to a case where one of source languages such as English and German is translated into a target language. Although in the present embodiment, a pronoun is used at a place corresponding to the omitted phrase, an English noun corresponding to the omitted phrase may be used in place of the pronoun.

As has been explained in the foregoing, according to the present invention, even when a phrase is omitted in an original text of a source language, a target language translation which is grammatically correct, can be formed by utilizing an appropriate pronoun or others, and thus the quality of target language translation can be greatly improved.

What is claimed is:

1. A translation method for a machine translation apparatus for translating a source language sentence being input to said machine translation apparatus into an equivalent target language sentence, said source language sentence including a plurality of words and being inputted to said machine translation apparatus in a form of an electrical signal from an input device, said machine translation apparatus carrying out predetermined translation processes by referring to an electronic data storage device having a word dictionary storage area, a sentence pattern dictionary storage area and a table storage, said word dictionary storage area storing a plurality of word records each defining a relation among a source language word, a part of speech of said source language word, a target language word corresponding to said source language word and a semantic feature of these words, said sentence pattern dictionary storage area including a plurality of sentence pattern records each of which defines cases governed by a predicated in the source language sentence and includes semantic features of respective cases, said cases being arranged in each sentence pattern record in accordance with a word order of target language words in an apparent structure of the target language sentence, said method comprising the steps of:

(a) dividing said source language sentence inputted by said input device into a plurality of words by referring to said word dictionary storage area to search for a predicate and nouns in said source language sentence;

(b) storing contents of respective word records of said word dictionary storage area, each of which includes a source language word corresponding to one of the nouns obtained by a search of said input source language sentence, sequentially into a noun stack area within said table storage area;

(c) parsing said source language sentence by referring to one sentence pattern record in said sentence pattern dictionary storage area which includes a predicate same as that obtained by the search of said input source language sentence, and judging whether a case, which is indispensable for the translating of the input source language sentence into a target language sentence, is omitted in said input source language sentence or not;

(d) when it is judged at the step (c) that a case is omitted, searching, among word records in said noun stack area, for one word record having the same semantic feature as that of said omitted case of said input source language sentence; and (e) substituting a noun defined by said one word record obtained by the search of said noun stack area for said omitted case, and arranging a target language word for said noun to be substituted and target language words corresponding to words of said input source language sentence obtained from word records in said word dictionary storage area in accordance with the word order defined by said one sentence pattern record.

2. A translation method according to claim 1, wherein said electronic data storage device has a personal pronoun table storage area for storing declensions of personal pronouns, each of the word records stored in said word dictionary storage area includes a gender and a person of a target language word, each of the word records stored in said noun stack area in said step (b) includes a semantic feature, gender and a person for the noun, and said step (e) supplies said omitted case with one pronoun which is obtained based on a content of said one word record obtained by the search of said noun stack area and a content of said personal pronoun table storage area.

3. A translation method according to claim 1, wherein said step (c) includes a substep of temporarily storing in said table storage area an intermediate expression frame comprising a plurality of cases and target word records, said cases corresponding to cases of said one sentence pattern and having an arrangement same as that of said one sentence pattern, each of said target word records being associated with one of said cases and obtained from one of said word records in said word dictionary storage area which includes source language words corresponding to the words in said input source language sentence, said step (d) includes a substep of adding to said intermediate expression frame a target word record for said omitted case which was obtained from said one word record searched in said noun stack area, and said step (e) forms said target language sentence based on said intermediate expression frame stored in said table storage area.

4. A translation method according to claim 3, wherein said electronic data storage device has a personal pronoun table storage area for storing declensions of personal pronouns, each of the word records in said word dictionary storage area includes a gender and a person of a target language word, each of the word records stored in said noun table area in said step (b) includes a semantic feature, gender and person for the noun, and said step (e) includes a substep of substituting a person for said omitted case based on a content of said personal pronoun table storage area and gender and person in said one word record obtained by the search of said noun stack area as said intermediate expression frame.

5. A translation method according to claim 1, wherein said noun stack area stores sequentially a plurality of word records, each of which includes information as to a noun corresponding to one of nouns extracted from source language sentences which have been translated already, and said step (b) is executed after said step (d).

6. A translation method according to claim 5, wherein said search of said noun table area in said step (d) is performed by checking whether each of the word records stored in said noun table area has the same semantic feature as said omitted case in accordance with an order of the word record lastly stored therein.

* * * * *